US010225281B2

(12) United States Patent
Daniell et al.

(10) Patent No.: US 10,225,281 B2
(45) Date of Patent: *Mar. 5, 2019

(54) PREVENTING EXECUTION OF PROGRAMS THAT ARE EMBEDDED IN EMAIL MESSAGES

(71) Applicant: Uber Technologies, Inc., San Francisco, CA (US)

(72) Inventors: W. Todd Daniell, Kennesaw, GA (US); Dale W. Malik, Dunwoody, GA (US)

(73) Assignee: UBER TECHNOLOGIES, INC., San Francisco, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 15/207,661

(22) Filed: Jul. 12, 2016

(65) Prior Publication Data
US 2016/0323296 A1 Nov. 3, 2016

Related U.S. Application Data

(63) Continuation of application No. 13/632,610, filed on Oct. 1, 2012, now Pat. No. 9,432,216, which is a continuation of application No. 12/638,662, filed on Dec. 15, 2009, now Pat. No. 8,281,247, which is a continuation of application No. 10/408,378, filed on Apr. 7, 2003, now Pat. No. 7,657,838.

(Continued)

(51) Int. Cl.
G06F 17/00 (2006.01)
H04L 29/06 (2006.01)
G06Q 10/10 (2012.01)
H04L 12/58 (2006.01)
G06F 3/0481 (2013.01)
G06F 3/0484 (2013.01)

(52) U.S. Cl.
CPC ........ H04L 63/145 (2013.01); G06F 3/04812 (2013.01); G06F 3/04842 (2013.01); G06Q 10/107 (2013.01); H04L 51/04 (2013.01); H04L 51/12 (2013.01); H04L 51/14 (2013.01); H04L 63/168 (2013.01); H04L 51/063 (2013.01)

(58) Field of Classification Search
CPC .... G06F 3/04842; H04L 63/234; H04L 51/14
USPC ....... 715/752, 234, 253, 760; 726/22, 23, 24
See application file for complete search history.

(56) References Cited

U.S. PATENT DOCUMENTS 6,112,192 A 8/2000 Capek
6,304,898 B1 10/2001 Shiigi
(Continued)

OTHER PUBLICATIONS

Thomas Greene, No-HTML Plugin for Outlook Available, Published Dec. 6, 2001, The Register.*
(Continued)

Primary Examiner — Stephens S Hong
Assistant Examiner — Matthew J Ludwig
(74) Attorney, Agent, or Firm — Fenwick & West LLP

(57) ABSTRACT

Systems and methods are presented which generate modified email messages, which are largely devoid of embedded functions, from original email messages, which have embedded functions. The embedded functions are amenable to self-executing codes such as viruses, worms, and Trojan programs. Thus, the modified email message without these embedded functions, and any argument associated with these functions, provides a more secure email environment.

20 Claims, 8 Drawing Sheets

Related U.S. Application Data

(60) Provisional application No. 60/416,916, filed on Oct. 8, 2002.

(56) References Cited

U.S. PATENT DOCUMENTS

| | | | |
|---|---|---|---|
| 6,598,076 | B1 | 7/2003 | Chang et al. |
| 6,728,757 | B1 | 4/2004 | Friend |
| 6,779,022 | B1 * | 8/2004 | Horstmann ............ H04L 51/14 709/206 |
| 6,941,459 | B1 | 9/2005 | Hind et al. |
| 7,117,210 | B2 | 10/2006 | DeSalvo |
| 7,308,439 | B2 | 12/2007 | Baird et al. |
| 7,318,238 | B2 | 1/2008 | Elvanoglu et al. |
| 7,370,278 | B2 | 5/2008 | Malik et al. |
| 7,373,664 | B2 | 5/2008 | Kissel |
| 7,380,277 | B2 | 5/2008 | Szor |
| 7,487,544 | B2 | 2/2009 | Schultz et al. |
| 7,546,465 | B2 | 6/2009 | Kent, Jr. et al. |
| 8,484,478 | B2 | 7/2013 | Kent, Jr. et al. |
| 9,762,549 | B2 | 9/2017 | Kent, Jr. et al. |
| 2003/0219104 | A1 | 11/2003 | Malik |
| 2003/0229722 | A1 | 12/2003 | Beyda |
| 2004/0078448 | A1 | 4/2004 | Malik et al. |
| 2004/0111478 | A1 | 6/2004 | Gross et al. |
| 2004/0128356 | A1 | 7/2004 | Bernstein et al. |
| 2005/0030937 | A1 | 2/2005 | Wick et al. |
| 2005/0080867 | A1 | 4/2005 | Malik et al. |

OTHER PUBLICATIONS

Makiguchi, Getting Started with Outlook 2000 for Windows, Univeristy of Hawaii, Nov. 2005.*

Securiteam, No HTML Built-in Outlook 2002 Feature Protects Against Malicious Code, Dec. 18, 2001, pp. 1-2 (available at www.securiteam.com/windowsntfocus/6M00D2A3FW.html).

Microsoft Outlook 2000, User Guide, (1999) (Available at http://helpdesk.nus.edu.sg/support/uder/guides/OL2K/default.htm), pp. 1-16.

A Plan for Spam, Aug. 2002, http://www.paulgraham.com/spam.html, pp. 1-13.

Better Bayesian Filtering, Jan. 2003, http://paulgraham.com/better.html, pp. 1-11.

Thomas Greene, 'No-HTML plugin for Outlook Available', Published Dec. 6, 2001, TheRegister.co.uk.

United States Office Action, U.S. Appl. No. 13/632,610, dated Aug. 21, 2015, 10 pages.

United States Office Action, U.S. Appl. No. 13/632,610, dated Mar. 13, 2015, 10 pages.

United States Office Action, U.S. Appl. No. 10/408,378, dated May 13, 2009, 13 pages.

United States Office Action, U.S. Appl. No. 10/408,378, dated Aug. 19, 2008, 14 pages.

United States Office Action, U.S. Appl. No. 10/408,378, dated Feb. 5, 2008, 13 pages.

United States Office Action, U.S. Appl. No. 10/408,378, dated Sep. 21, 2007, 14 pages.

United States Office Action, U.S. Appl. No. 10/408,378, dated Apr. 4, 2007, 13 pages.

United States Office Action, U.S. Appl. No. 10/408,378, dated Sep. 18, 2006, 14 pages.

United States Office Action, U.S. Appl. No. 10/408,378, dated Apr. 10, 2006, 12 pages.

United States Office Action, U.S. Appl. No. 10/408,378, dated Oct. 7, 2005, 10 pages.

* cited by examiner

PREVENTING EXECUTION OF PROGRAMS THAT ARE EMBEDDED IN EMAIL MESSAGES

CROSS REFERENCE TO RELATED-APPLICATIONS

This application claims priority to and is a continuation of U.S. patent application Ser. No. 13/632,610, filed Oct. 1, 2012, which is a continuation of U.S. patent application Ser. No. 12/638,662, filed Dec. 15, 2009, now U.S. Pat. No. 8,281,247, which is a continuation of U.S. patent application Ser. No. 10/408,378, filed Apr. 7, 2003, now U.S. Pat. No. 7,657,838, issued on Feb. 2, 2010, which claims the benefit of U.S. provisional patent application Ser. No. 60/416,916, filed Oct. 8, 2002, all of which are herein incorporated by reference in their entireties.

FIELD OF THE INVENTION

The present disclosure relates generally to the Internet and, more particularly, to email.

BACKGROUND

Modern email systems are amenable to email messages in either a plain-text format (e.g., American standard code for information interchange (ASCII)) or an encoded format (e.g., hypertext markup language (HTML), multi-purpose Internet mail extension (MIME), etc.). While plain-text email messages are sufficient for simply conveying message content to intended recipients, these plain-text email messages provide very few options on how the email messages are displayed due to their limited functionality.

Conversely, email messages in encoded formats have greater functionality. For example, HTML-formatted email messages may include bitmap images that are directly embedded into the email message itself. Thus, when a recipient receives the HTML-formatted email message, the embedded bitmap image is automatically displayed to the recipient in an email read window.

While many of the embedded items in encoded-format email messages are harmless, the ability to introduce self-executing code into encoded-format email messages results in a greater susceptibility of encoded-format email messages to viruses, worms, Trojan programs, etc.

Thus, a heretofore unaddressed need exists in the industry to reduce the susceptibility of encoded-format email messages to undesired executable programs.

SUMMARY

Preferred embodiments of the present disclosure provide systems and methods for preventing execution of executable functions that are embedded in email messages.

Briefly described, in architecture, one embodiment of the system comprises logic adapted to search an original email message to find an embedded function, and logic adapted to generate a modified email message without the embedded function.

The present disclosure also provides methods for preventing execution of executable functions that are embedded in email messages.

In this regard, one embodiment of the method comprises the steps of searching an original email message to find an embedded function, and generating a modified email message without the embedded function.

Other systems, methods, features, and advantages will be or become apparent to one with skill in the art upon examination of the following drawings and detailed description. It is intended that all such additional systems, methods, features, and advantages be included within this description.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present invention. Moreover, in the drawings, like reference numerals designate corresponding parts throughout the several views.

DETAILED DESCRIPTION

Figure 1:
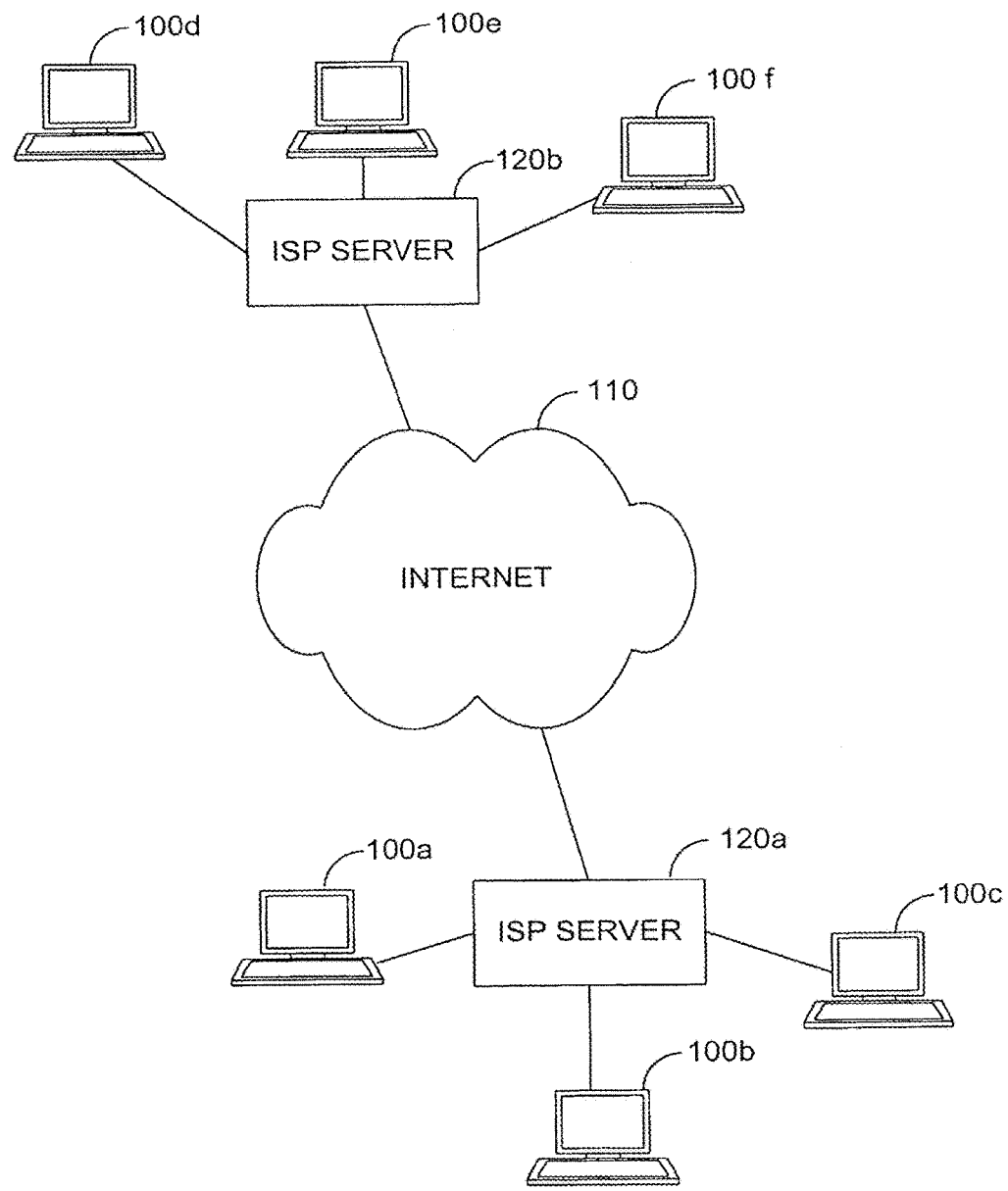
FIG. 1 is a block diagram of an embodiment of an email architecture used to transfer email between client computers.

Reference is now made in detail to the description of the embodiments as illustrated in the drawings. While several embodiments are described in connection with these drawings, there is no intent to limit the invention to the embodiment or embodiments disclosed herein. On the contrary, the intent is to cover all alternatives, modifications, and equivalents.

In a broad sense, the several embodiments disclosed herein provide systems and methods that are more secure from attack by viruses, worms, or Trojan programs. Since these undesired programs may be embedded as self-executing code in non-ASCII-based email systems (e.g., HTML-based email systems), the generation of a modified email message without the embedded functions, which are amenable to the embedding of self-executing codes, may greatly reduce the opportunity for such attacks.

FIG. 1 shows a block diagram illustrating an architecture used for email transport and delivery used in several embodiments of the present invention. Each of a plurality of remote computers 100a ... 100f accesses the Internet 110 (or other network) through a local Internet service provider (ISP) server 120a, 120b (or other gateway systems). It should be recognized by one skilled in the art that the ISP server 120a, 120b can offer access to the Internet 110 through a plethora of connection types, including a digital subscriber line (DSL) service, an integrated services digital network (ISDN) service, an analog dial-up service, ethernet, T-1, or any other service for transmitting data through a network. Each of the ISP servers 120a, 120b, in turn, is connected to the Internet 110. This Internet connectivity enables the ISP servers 120*a*, 120*b* and other servers connected to the Internet to transfer information between the servers 120*a*, 120*b* using various protocols that are recognized by the servers.

With specific regard to email, the ISP servers 120*a*, 120*b* generally include both a post office protocol 3 (POP3) server and a simple mail transfer protocol (SMTP) server capable of supporting multipurpose Internet mail extension (MIME) encoded files. Typically, the email client on computers 100*a* . . . 100*f* include a POP3 component and an SMTP component with MIME encapsulation for non-ASCII attachments. The SMTP component on a computer 110*a* . . . 100*c* may transfer an email message in SMTP format to the SMTP server residing on an ISP server 120*a*. The SMTP server then transfers the received email to the correct ISP server 120*b* where it is stored on the POP3 server. Alternatively, one skilled in the art should recognize that the POP3 server can be replaced by an Internet message access protocol 4 (IMAP4) server which can perform all of the POP3 functions, and that has features additional functions for flexibility and efficiency. As mentioned before, the computers 100*a* . . . 100*f* each has an email client that includes a POP3 component. The POP3 component on the computer 100*d* . . . 100*f* can contact the POP3 server on the local ISP server 120*b* and retrieve messages for the user logged in to the client on the respective computer 100*d* . . . 100*f*.

Figure 2A:
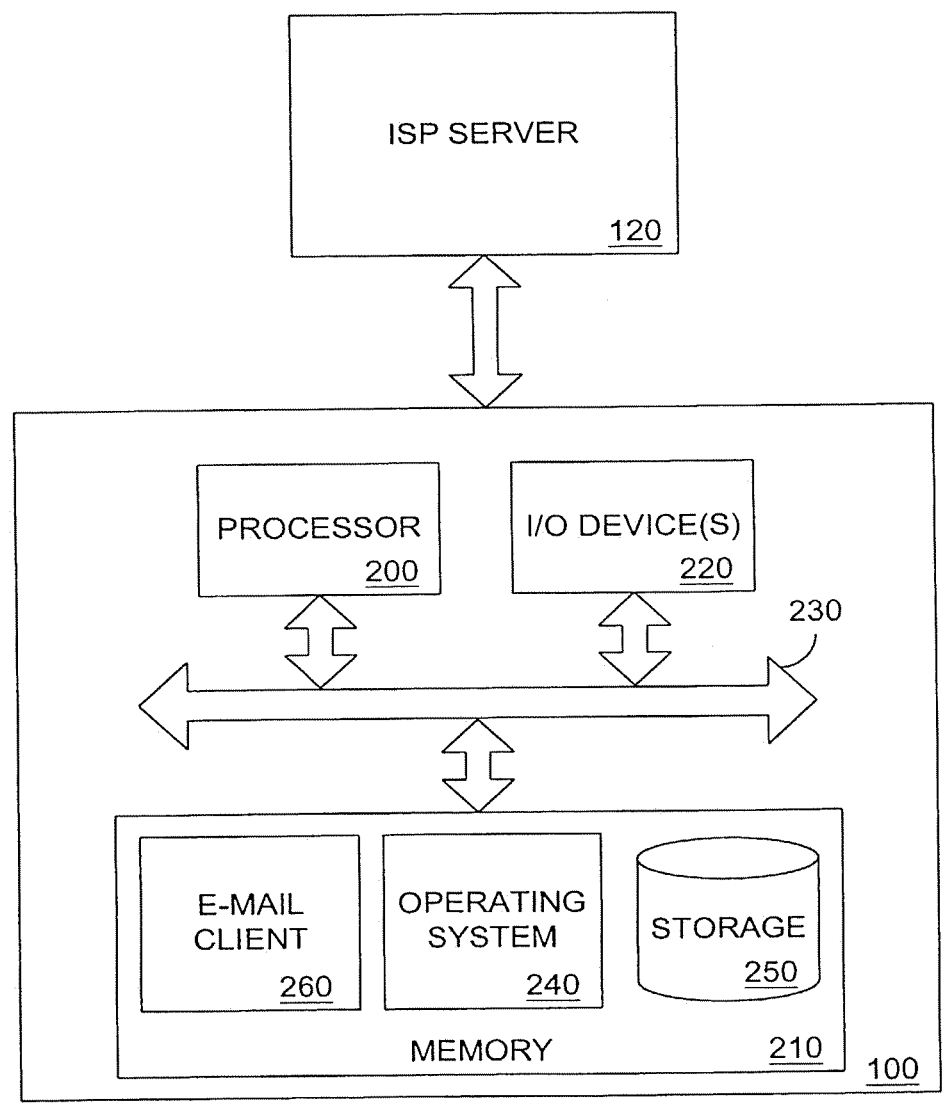
FIG. 2A is a block diagram of an embodiment of the client computers of FIG. 1, including the email client of the present invention.

FIG. 2A shows a block diagram of an embodiment of a computer system shown in FIG. 1. As known to those skilled in the art, a computer system typically includes a processor 200, memory 210 and input/output (I/O) device(s) 220, all communicating over a bus 230. The memory typically includes the operating system 240 and non-volatile storage 250. The operating system is typically stored in non-volatile memory while the computer 100 is turned off, and loaded into volatile memory upon start-up, where it can be executed by the processor 200. In the present embodiment, the memory includes an email client 260 which enables the computer to send/receive email messages to/from the ISP server 120 through an I/O device 220 such as an analog modem, DSL modem, ISDN modem or ethernet card, among others. The email client 260, as discussed above, typically includes a retrieval component (such as POP3) to receive email, a transfer component (such as SMTP) to send email, and some sort of user interface logic to format the output to provide a display that can be understood by the computer user.

Figure 2B:
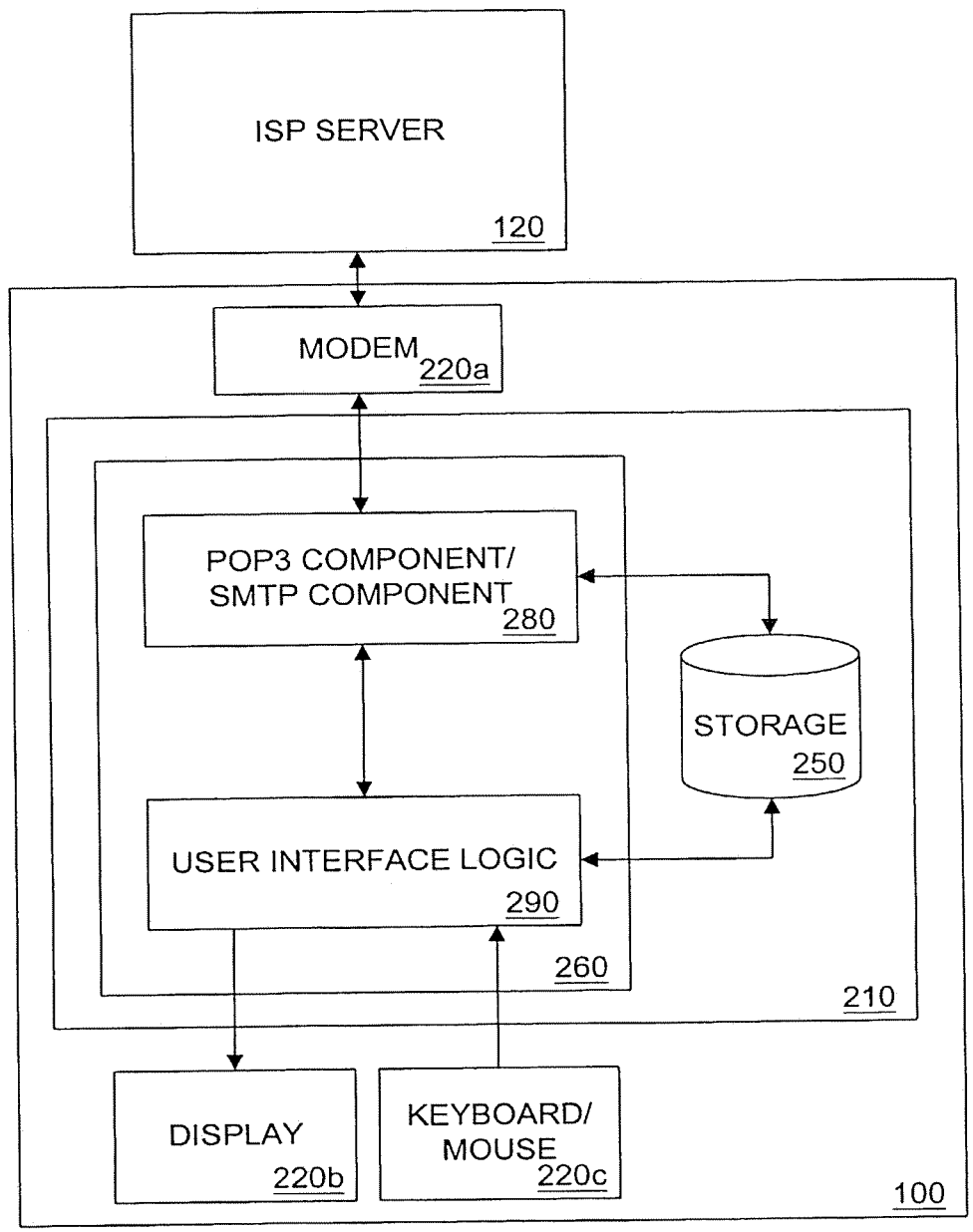
FIG. 2B is a block diagram of an embodiment of the client computers of FIG. 1, illustrating some functionality of the email client.

FIG. 2B shows a more detailed diagram of the email client 260 of FIG. 2A. As mentioned above, the email client includes POP3 and SMTP components 280. As one skilled in the art will recognize these protocols merely relate to retrieving and sending email. As such, it is intended that other protocols, which operate to send and retrieve email, such as IMAP4, are intended to be included herein. The POP3 component 280 in this embodiment typically downloads email from the ISP server 120 through an I/O modem device 220*a*, and stores the email in non-volatile storage 250 as an original email message. Moreover, the POP3 server in this embodiment can be set up to retrieve messages for more than one email account.

User interface logic 290 included within the email client 260 can retrieve the original messages from the non-volatile storage, format the information, and send the formatted information to the I/O display device 220*b*. In particular, the user interface logic 290, in several embodiments of the present invention, is configured to search the original email message retrieved from non-volatile storage 250 in order to find embedded functions. In several embodiments, the embedded functions correspond to specific tags that are indicative of the embedded functions. For example, in hypertext markup language (HTML) formatted email messages, these functions may include JScript, VBScript, applet, input, object, or a plethora of other HTML elements. Thus, for those embodiments, the user interface logic 290 filters the original message for an HTML tag, which is indicative of the embedded HTML function. These tags are then compared to a predefined list of tags, which are amenable to self-executing codes such as viruses, worms, or Trojan programs. For example, the predefined list of tags may include HTML elements such as input, VBScript, JScript, applet, and object, which are all amenable to embedding of self-executing codes. In some embodiments, the predefined list of tags is supplied to a user by the manufacturer or vendor. In other embodiments, the predefined list of tags may be generated by the user to indicate which tags should be removed, and which tags should not be removed from a modified email message when generating the modified email message. In this regard, the predefined list of tags may be a vendor-supplied list that may be expanded or truncated by the user.

If the user interface logic 290 determines that one or more embedded functions each has a tag that corresponds to one of the tags in the predefined list of tags, then the user interface logic 290 creates a modified email message that is a copy of the original email message without the embedded functions. Thus, the embedded functions are effectively removed by making a copy of the original email message that does not include the tag(s) and any argument(s) and tagged text associated with the tag(s). The modified email message is stored, for example, in random access memory (RAM), which can then be rendered and displayed in a conventional manner. In other words, for HTML-based email messages, the modified email message, which is stored in RAM, may be interpreted and rendered for display in such a manner that those HTML-tags that are normally ignored are not displayed while the remainder of the document is displayed.

Unlike output of known virus-protection systems in which email messages are stored in non-volatile memory, such as a hard drive, without embedded functions, the original email messages in several embodiments of the present invention are stored in non-volatile memory with all of the embedded functions still intact. Thus, when the modified email message is generated from the original email message into RAM, for example, the original email message remains intact while the modified email message is rendered for display.

In example embodiments that employ HTML tags, the structure of the embedded function may appear as follows:
   <START_TAG ARGUMENT>Tagged Text<END_TAG>

Thus, it should be appreciated that the tag includes both the START_TAG, which indicates the beginning of an HTML element, and the END_TAG, which indicates the end of the HTML element. In this regard, for HTML-based systems, the removal of the tag results in the removal of both the HTML start tag and the HTML end tag. Similarly, it should be appreciated that arguments associated with the tag refer to any arguments (e.g., attributes, parameters, etc.) that are delineated by the tags, and tagged text is typically surrounded by the starting and ending tags.

In operation, an original email message, which is stored on the hard drive (or other non-volatile memory) is selected when a user chooses an original email message from the active folder or when a cursor is placed over an original email message in the active folder. Once selected, the original email message is searched for embedded functions that may be amenable to self-executing codes. Those embedded functions, which are amenable to self-executing codes, are then removed during the generation of a modified email message. All other tags and arguments are left intact, thereby providing an otherwise complete message. The modified email message without the embedded functions is preferably stored in RAM, and subsequently used for display. Thus, during the display process, the original email message, which has all of the embedded functions, remains intact in the non-volatile memory (e.g., hard drive) while the modified email message, which is devoid of several embedded functions, also exists concurrently.

A "read" window is opened and the modified email message is displayed in the read window, thereby enabling the user to read the modified email message. As is known, those embedded functions (e.g., HTML tags) that are unrecognizable may simply be ignored during processing. In this regard, neither the ignored functions nor the removed functions would be displayed in the read window. Since the modified email message is largely free of embedded functions that may include self-executing code, the displayed email message itself provides less opportunity for worms, viruses, or Trojan programs to corrupt the user's computer.

In some embodiments, where the modified email message is temporarily stored in RAM, the temporarily-stored modified email message is removed from RAM when the user closes the read window or when the cursor is placed on a different message in the active folder.

In several embodiments, when the user chooses to forward the displayed email to another recipient, the user interface logic 290 forwards the original email message, rather than the modified email message, to the recipient. Similarly, if the user wishes to save the displayed email message, the user interface logic 290 saves the original email message, rather than the modified email message. In this regard, the actual contents of the email message are never destroyed. Rather, the potentially harmful aspects of the email are merely absent in the modified email message, thereby permitting safer rendering of the modified email message for display. Thus, if the user chooses to view the entire contents of the original email message, including the embedded functions, the user may open the saved message using a conventional email client. For those instances, if the original email message is corrupted by a harmful self-executing code, such as a virus, worm, or Trojan program, then the conventional email client would typically launch that self-executing code. In alternative embodiments, the system may be adapted to provide the option of viewing the original message having the embedded functions, or the option of viewing the modified message without the embedded functions.

Upon a user choosing to write a new email, reply to the displayed email, or forward the displayed email, user interface logic 290, in several embodiments, will open a "write" window that will enable the user to compose a message. Moreover, user interface logic 290, upon opening the window, will stamp the message with the currently active mailbox, or alternatively, will stamp a reply from the email address at which it was received. One skilled in the art will understand that the user typically inputs the email on an I/O device 220c such as a keyboard or mouse. Moreover, one skilled in the art will recognize other input devices on which text and commands can be input, such as voice recognition software, and each of the alternative input devices are intended to be included within the scope of this invention.

Upon completion of the email, the user can instruct the email client to send the email. User interface logic 290 will send the message to non-volatile storage 250, if the user has set up the option to save sent messages, and transfer the message to the SMTP component 280. The SMTP component 280 will then transfer email to the ISP server 120 over the modem 220a, if the computer is on-line. If the computer is not on-line the SMTP component 280 will send the message to be stored in non-volatile storage 250 pending being sent the next time the computer is connected to the ISP server 120. As known to those skilled in the art, there are many different ways to facilitate reading and writing a message, and the invention presented herein should not be limited to a particular method for displaying the text of a message or for composing a message.

Figure 3:
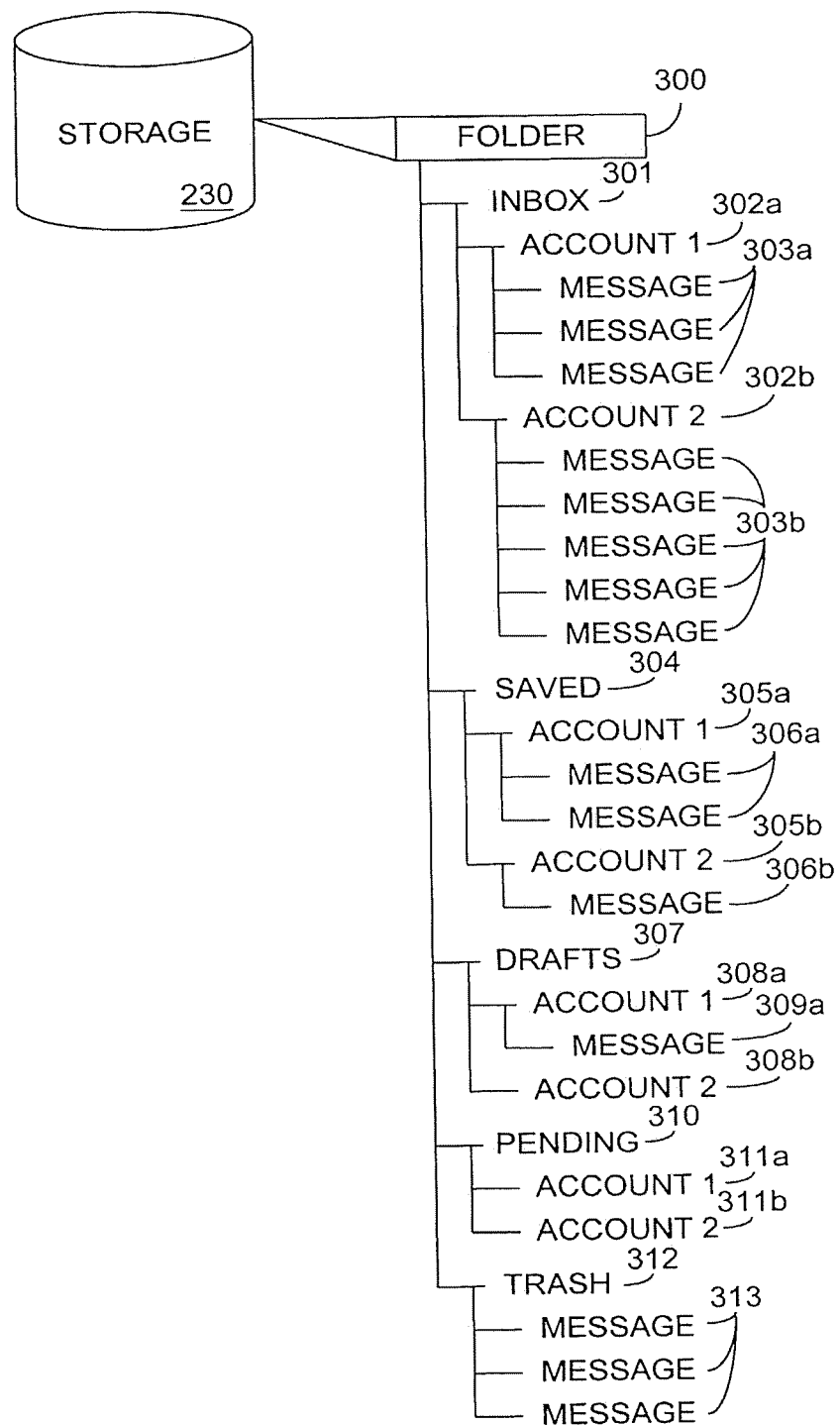
FIG. 3 is a diagram of an embodiment of a data structure that can be used in the storage area of FIG. 2B.

FIG. 3 shows an embodiment, among others, of a data structure of the non-volatile storage 250 corresponding to the email client 260 and user interface logic of FIG. 2B. Within the non-volatile storage 250 is included a email client folder 300 which corresponds to all of the information regarding the email client 260. The folder 300 can contain other folders and messages. In this embodiment, the folder includes a link (through the header) to an "Inbox" folder 301. The "Inbox" folder 301, is further linked to folders for "Account 1" 302a and "Account 2" 302b. These Account folders 302a, 302b each correlate to an email address. For example, in a household environment, "Account 1" 302a might be a husband's email address, while "Account 2" is a wife's email address. Each of the account folders 302a, 302b contain links to messages 303a, 303b. The messages are linked according to which "Inbox" folder they belong. As such, all of the messages 303b sent to "Account 2" are linked to the "Account 2" folder 302b. Moreover, each of the account folders 302a, 302b shown could contain links to message "Thread" folders (not shown). These "Thread" folders could be set up to keep track of a back-and-forth series of messages between users, such that a user would be able to keep track of things such as how the conversation started, when the last response occurred, exactly what was said during the back-and-forth series, etc.

The email client folder 300 can further include a relationship with a "Saved" folder 304, which stores messages for later use, clearing a user's "Inbox" folder 301 of old email messages. Like the "Inbox" folder 301, the "Saved" folder 304 includes a link to "Account 1" and "Account 2" folders 305a, 305b. These account folders 305a, 305b each contain messages 306a, 306b that relate to the respective account folders 305a, 305b which link the messages 306a, 306b.

The email client folder 300 can further include a link to a "Drafts" folder 307, which stores drafts of email messages that the user has not chosen to send to the recipient yet. Like the "Inbox" 301 and "Saved" folders 304, the "Drafts" folder 307 includes links to folders 308a, 308b for each of the accounts entered into the email client, but are searched according to the "From" field instead of the "To" field. These account folders 308a, 308b contain links to any respective outgoing messages 309a which have been saved in the "Drafts" folder 307 for later use. In the present example, "Account 1" folder 308a contains a link to a message 309a which has been saved by a user associated with the "Account 1" folder 308a.

The email client folder 300 can further include a link to a "Pending" folder 310, which is used to save drafts of messages that the user has chosen to send, but the email client is unable to send because the computer 100 (FIG. 2) is not connected to the ISP server. The "Pending" folder 310 includes links to account folders 311a, 311b dividing the "Pending" folder into the number of accounts which have been entered into the email client. No pending messages are shown in this embodiment, however, when a message is pending it will be linked under the account folder 311a, 311b from which it is to be sent, similarly to the "Drafts" folder 307.

The email client folder 300 can further include a link to a "Trash" folder 312, which includes messages which are intended to be thrown away. In this embodiment, among others, of the present invention, the "Trash" folder 312 is a universal trash folder that does not contain any partitions or links to any of the accounts which have been entered into the email client. Instead, all of the messages are thrown together, as they would be in a family's garbage. In alternative embodiments, a user can set up an option to send messages to the "trash" folder immediately after closing a "read" window that was used to read a message from the "inbox," unless the user requests to place the message in another folder. Moreover, when a message is removed from the "Trash" folder it is permanently deleted. The "Trash" folder can be set up to remove messages regularly, or upon request by the user.

One skilled in the art will recognize that there are many ways to implement each of these folders, and that particular details of the folders are not critical to the invention disclosed herein. Moreover, there exist myriad other folders that may be included in the email client in conjunction with the present invention. All such variants are intended to be included within the scope of the present invention. It should, again, be appreciated that all messages saved within these various folders are original email messages, which include all embedded functions, rather than modified email messages, which are largely free of embedded functions that are amenable to self-executing code. In this regard, the saved messages are typically modified only for display, thereby likely preventing the launching of any harmful code during the displaying of the message.

Figure 4:
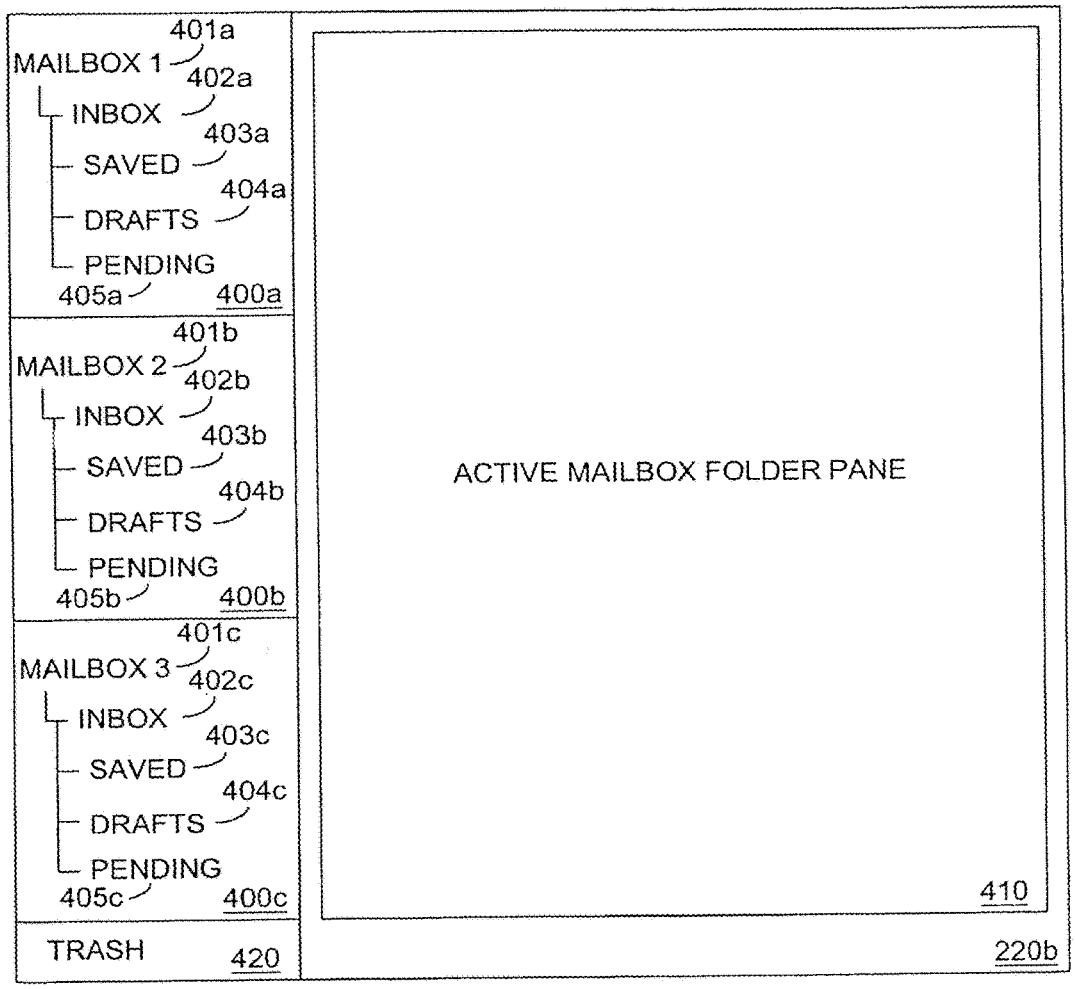
FIG. 4 is a generic screen shot of an embodiment of the email client of FIG. 2B, included in the present invention.

FIG. 4 shows an embodiment, among others, of a generic display 220b output to the user by user interface logic 290 (FIG. 2B). Designations for each of the email accounts entered into the email client are displayed separately on the left side of the display 220b. The display for the default email account 400a is typically shown in the first position at the upper left of the display 220b. The display for the default email account includes a mailbox name 401a, which can be customized by the user. For example, the mailbox might be a work mailbox, and so the user would label-the mailbox as "work stuff." Appearing below the mailbox name typically will be the "Inbox" folder designation 402a corresponding to the mailbox designation. Below the "Inbox" folder designations 402a, there can be sub-folder designations such as "Saved" 403a, "Drafts" 404a, and "Pending" 405a. By selecting any one of these folder or sub-folder designations, the user will be enabled to view the contents of that associated folder or sub-folder through the active mailbox folder pane 410. Moreover, each of the alternative email accounts 400b, 400c may have similar structures, and the active mailbox folder pane 410 will display the contents of those folders and sub-folders upon selection of those folders or sub-folder designations.

The display 220b may also include a collective "Trash" area representation 420. Here items that have been put in the trash will be stored collectively without regard for whose account the trashed message belongs to. Moreover, if a user wishes to view the items in the "Trash" area, the user may select the "Trash" area representation 420 and the active mailbox folder pane 410 will display a summary version of the messages contained within the "Trash" area.

One skilled in the art will recognize that the email account displays 400a, 400b, 400c can provide short summary information about the contents of each folder, such as the number of messages contained within that folder, the presence of a new message, etc. Moreover, one skilled in the art will recognize that typically when a folder 402a-c, 403a-c, 404a-c, 405a-c is selected, a list including further summary information will be provided in the active mailbox folder pane 410. Typically this further summary information can include an indication of whether or not the message has been read, who the message is from, when it was sent, a subject, etc. Moreover, the active mailbox folder pane 410 could include a preview pane that enables the user to see part of the text of a message when the message is highlighted by the user. It should be understood that each of these variances upon this mailbox are intended to be included within the present invention, since the display depends highly on stylistic preferences.

In example embodiments, the preview pane described above is configured to display the modified email message rather than the original email message. In this regard, when an original email message is selected for preview, the original email message is searched for embedded functions that may be amenable to self-executing codes. Those embedded functions, which are amenable to self-executing codes, are not copied when a modified email message is being generated. In this regard, the modified email message does not include the embedded functions that may be amenable to self-executing codes. The modified email message is then displayed in the preview pane. Since the modified email message is largely free of embedded functions that may include self-executing code, the displayed email message provides fewer opportunities for worms, viruses, or Trojan programs to corrupt the user's computer.

As shown here, the email client, in several embodiments of the invention, prevents corruption of the computer from various types of self-executing code, regardless of how the email message is displayed since the original email message is modified and stored in RAM as a modified email message before display to prevent execution of potentially harmful embedded functions.

Figure 5:
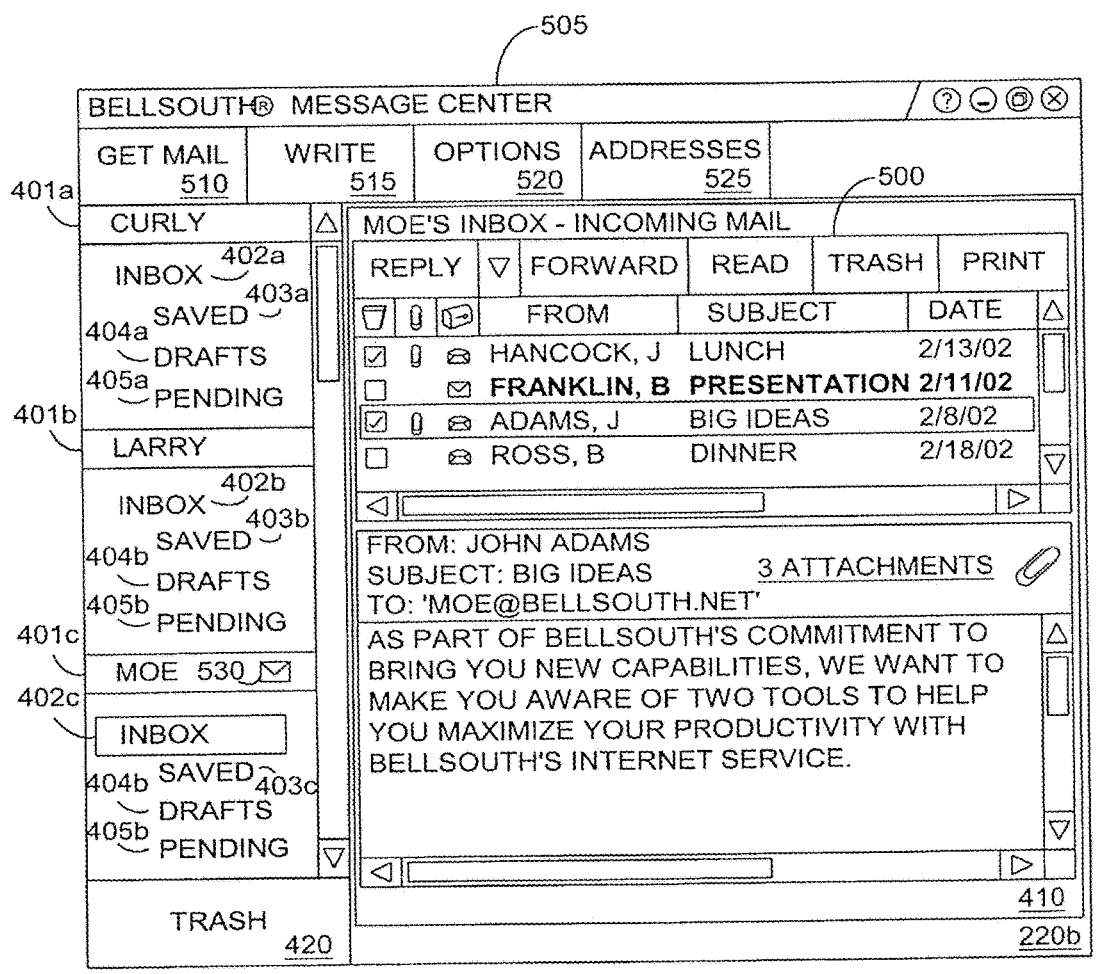
FIG. 5 is a detailed screen shot of an embodiment of the email client of FIG. 2B, included in the present invention.

FIG. 5 shows a detailed display window for several embodiments of the present invention. Here the mailbox representations 401a . . . 401c relating to each email address entered into the email client have been separated and named by the user(s) as "Curly," "Larry," and "Moe," respectively. Each of the mailbox representations 402a . . . 402c contains an "Inbox" folder representation 402a . . . 402c, a "Saved" folder representation 403a . . . 403c, a "Drafts" folder representation 404a . . . 404c, and a "Pending" folder representation 405a . . . 405c. A box around "Inbox" representation 402c indicates that this "Inbox" representation 402c has been selected/highlighted, and that the active mailbox is the mailbox named "Moe." Thus, the active mailbox preview pane 410 shows "Moe's Inbox." As one skilled in the art will recognize, this embodiment includes an email preview pane, such that at least a portion of the highlighted message can be viewed in the bottom section of the active mailbox folder pane 410. As noted above, the displayed email message in the email preview pane is the modified email message, which is largely free from potentially harmful embedded functions. In this regard, fewer opportunities are provided for viruses, worms, or Trojans to be launched from the email preview pane. It should, however, be appreciated that other embodiments may not provide preview panes, thereby displaying email messages in a separate read window.

One skilled in the art will recognize many functions included in the active mailbox folder pane 410, such as the user selectable buttons 500 at the top of the active mailbox folder pane 410. Each of these user selectable buttons 500 relates to a function that can be performed on the highlighted message. For example, if the user selected the "Reply" button, user interface logic 290 (FIG. 2B) would force the display of a window in which the user could compose a response to the highlighted message. Moreover, user interface logic 290 could automatically fill in the "From" field of the composition window with the mailbox to which the original message was sent, instead of filling in a default mailbox. Similarly, if the user wished to forward the message to a friend or colleague, the user could select the "Forward" button, and select the "Read" button to open a new window to read the message in its entirety. Basic aspects of these functions are familiar to those skilled in the art. In alternative embodiments, the mailbox representations 401a . . . 401c may be password protected, such that a user cannot switch between mailbox representations 401a . . . 401c and read another user's message without providing a password.

Further, the "Message Center" representation 505 typically includes several user selectable buttons (or menus) such as "Get Mail" 510, "Write" 515, "Options" 520, and "Addresses" 525. The "Get Mail" button 510 typically retrieves mail from the POP3 server on the ISP server 120 (FIG. 2B). The "Write" button 515 typically opens a new window enabling the user to compose a new message. Moreover, user interface logic can fill in the "From:" field of the new window with the presently selected mailbox, instead of merely the default mailbox as done in other email clients. The "Options" button 520 typically provides the user with a set of setup options where the user can change viewing preferences, mailboxes which are being checked, etc.

Figure 6:
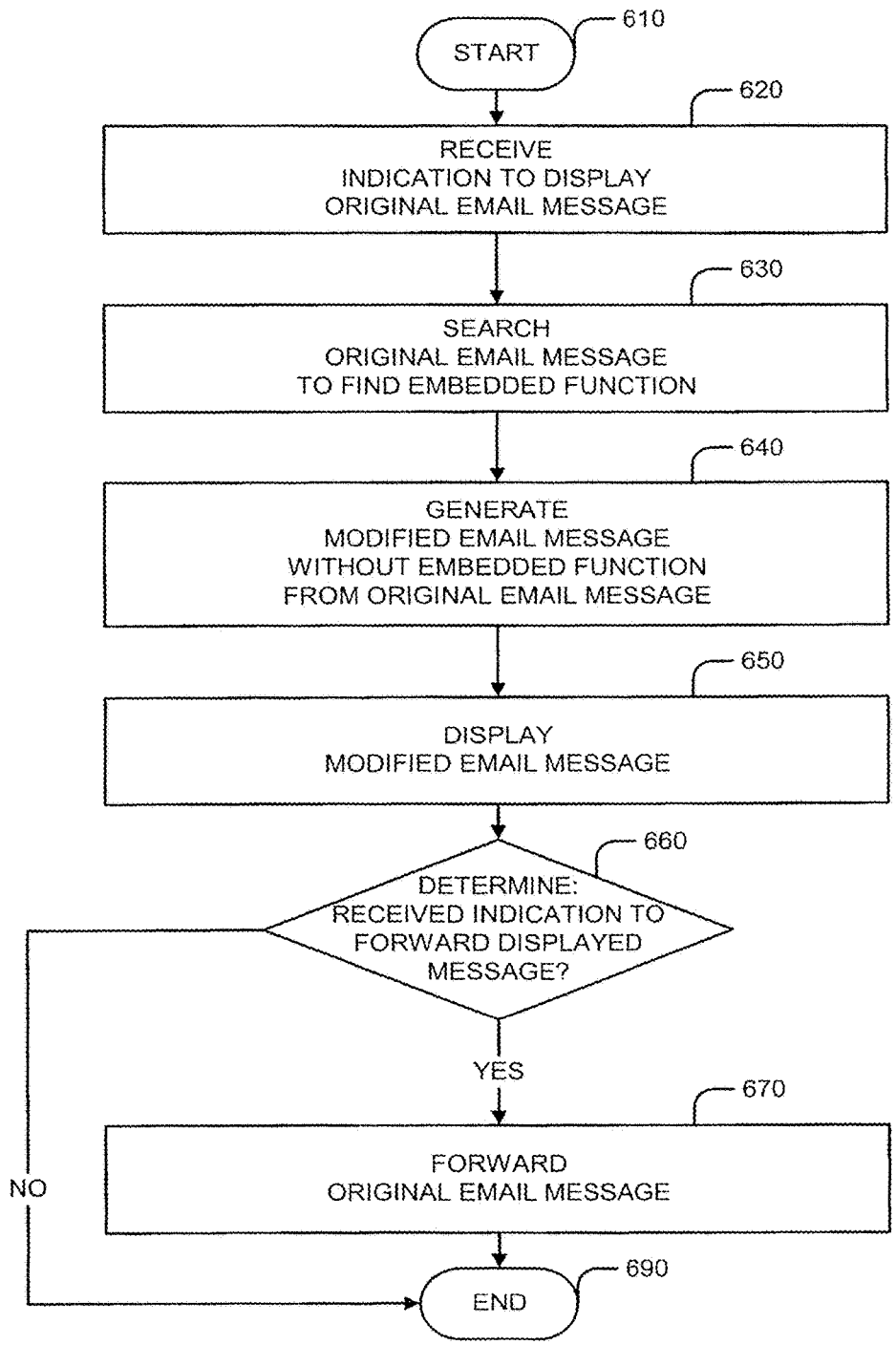
FIG. 6 is a flowchart showing an embodiment of a method for preventing execution of functions that are embedded in email messages.

FIG. 6 is a flowchart showing an embodiment of a method for preventing execution of functions that are embedded in email messages. As shown in FIG. 6, the method begin when an indication to display an original email message is received (620). In some embodiments, this indication may be a selecting of the email message using a mouse or other pointing device. In other embodiments, this indication may be the highlighting of the email message from a list by simply placing the cursor over the desired email message.

Once the indication is received (620), the original email message is searched (630) in order to find embedded functions. For some embodiments, the embedded functions are HTML tags that indicate an embedding of self-executing codes, such as viruses, worms, or Trojan programs. These tags may include the HTML elements VBScript, JScript, applet, object, or any other element that is deemed amenable to embedding self-executing codes.

A modified email message is generated (640) from the original email message. The embedded functions are, therefore, effectively removed from the modified email message. In other words, the modified email message does not have these embedded functions. Since the modified email message is largely free of embedded functions that may have self-executing codes, the modified email message is less likely to corrupt the user's computer with any harmful programs such as viruses, worms, or Trojan programs. The modified email message is then displayed (650) to the user.

If the user subsequently provides an indication to forward the displayed message, then the original email message is forwarded (670), rather than the modified email message. In this regard, the contents of the original email message are left undisturbed for other purposes, and the contents are merely modified for display so as to prevent execution of embedded functions when the email is being displayed to the user.

Figure 7:
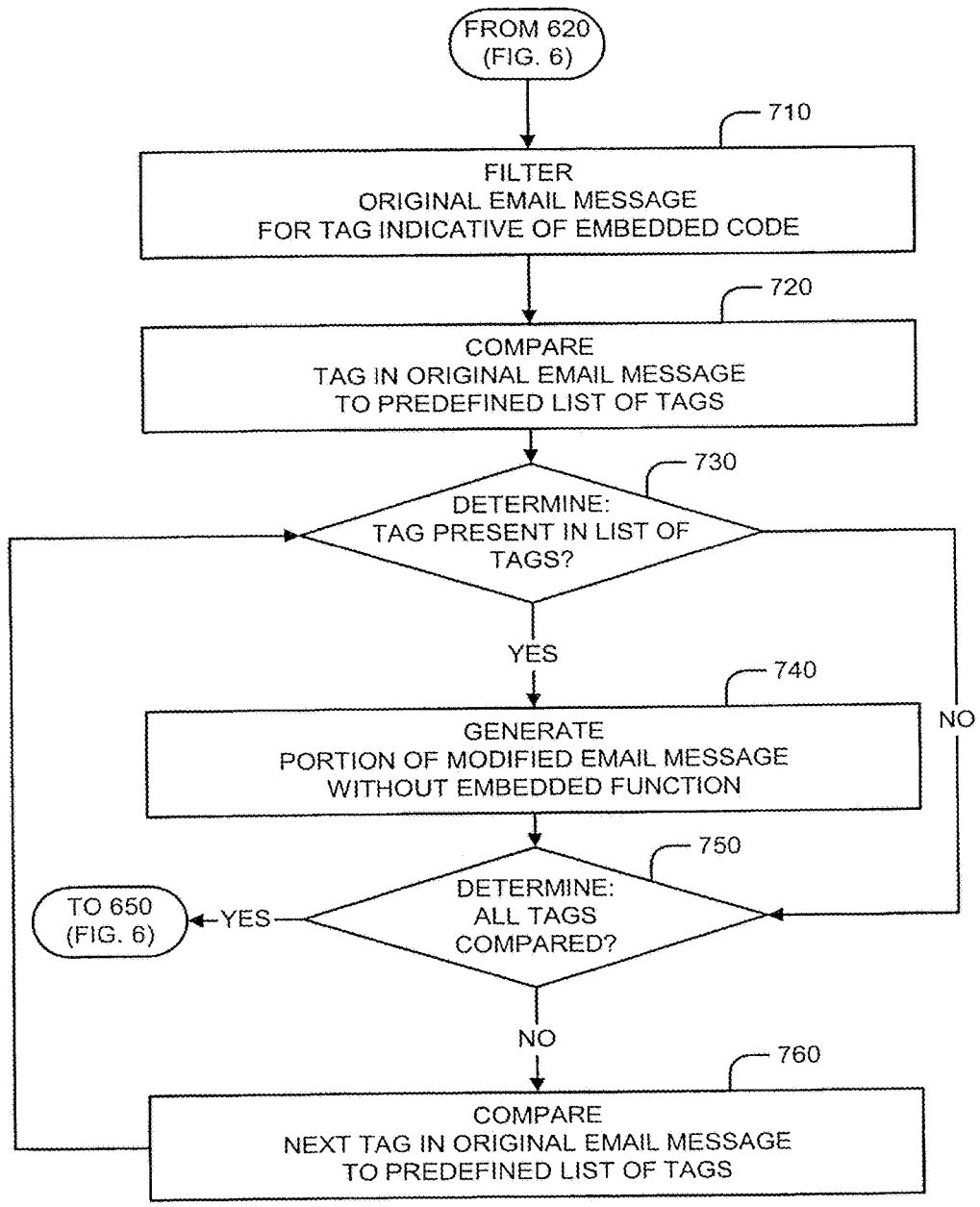
FIG. 7 is a flowchart showing another embodiment of a method for preventing execution of functions that are embedded in email messages.

FIG. 7 is a flowchart showing another embodiment of a method for preventing execution of functions that are embedded in email messages. Specifically, FIG. 7 shows the searching (630) and generating (640) steps of FIG. 6 in greater detail. In this regard, the process of FIG. 7 begins when an indication to display an original email message is received (620). Upon receiving (620) the indication, the original email message is filtered (710) for a tag that is indicative of an embedded code. For some embodiments, the tag may be an HTML tag.

The resulting tags from the filtering (710) step are compared (720) to tags in a predefined list of tags. The predefined list of tags may include HTML tags that are amenable to embedding of self-executing codes such as viruses, worms, or Trojan programs. In this regard, the predefined list of tags may include HTML tags such as VBScript, JScript, applet, input, object, etc.

Upon comparing (720) the tag in the original email message to the tags enumerated in the predefined list of tags, a decision (730) is made as to whether or not the tag in the original email message is in the predefined list of tags. If the tag is found in the predetermined list of tags, then a modified portion of the original email message is generated (740) without the tag and any argument associated with the tag, and a decision (750) is made as to whether or not all of the tags in the original email message have been compared to the tags in the predefined list of tags.

If, in step 730, the tag is not found in the predetermined list of tags, then the modified email message includes the tag, and a decision (750) is made as to whether or not all of the tags in the original email message have been compared to the tags in the predefined list of tags.

If all of the tags have not been compared to the tags in the predefined list of tags, then the next tag is compared (760) to the tags in the predefined list of tags, and the process repeats to step 730. If, on the other hand, all of the tags have been compared to the tags in the predefined list of tags, then the process continues by displaying (650) the modified email message. In other words, once all of the tags have been compared to the predefined list of tags, the resulting modified email message is free of the tags found in the predefined list of tags, and arguments associated with those tags.

As shown in the embodiments of FIGS. 6 and 7, the embodiments of the processes reduce the risk of launching self-executing codes by eliminating those codes from the email message. In this regard, risks associated with viruses, worms, and Trojan programs are reduced by the disclosed embodiments of the method.

The user interface logic 290 of the present invention can be implemented in hardware, software, firmware, or a combination thereof. In the preferred embodiment(s), the user interface logic 290 is implemented in software or firmware that is stored in a memory and that is executed by a suitable instruction execution system. If implemented in hardware, as in an alternative embodiment, the user interface logic 290 can be implemented with any or a combination of the following technologies, which are all well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

Process and function descriptions and blocks in flow charts can be understood as representing, in some embodiments, modules, segments, or portions of code which include one or more executable instructions for implementing specific logical functions or steps in the process, and alternate implementations are included within the scope of the preferred embodiment of the present invention in which functions may be executed out of order from that shown or discussed, including substantially concurrently or in reverse order, depending on the functionality involved, as would be understood by those reasonably skilled in the art of the present invention. In addition, such functional elements can be implemented as logic embodied in hardware, software, firmware, or a combination thereof, among others. In some embodiments involving software implementations, such software comprises an ordered listing of executable instructions for implementing logical functions and can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a computer-readable medium can be any means that can contain, store, communicate, propagate, or transport the software for use by or in connection with the instruction execution system, apparatus, or device.

It should be emphasized that the above-described embodiments of the present invention are merely possible examples of implementations set forth for a clear understanding of the principles of the invention. Many variations and modifications may be made to the above-described embodiment(s) of the invention without departing substantially from the principles of the invention. All such modifications and variations are intended to be included herein within the scope of this disclosure and the present invention and protected by the following claims.

The invention claimed is:

1. A system, comprising:
   a memory that stores instructions; and
   a processor that executes the instructions to perform operations, the operations comprising:
   generating, in response to receiving an indication to display a first email message, a second email message from the first email message, wherein generating the second email message includes:
   identifying a start tag within the first email message, the start tag indicating a beginning of an embedded function within the first email message;
   identifying an end tag within the first email message, the end tag corresponding to the start tag and indicating an end of the embedded function;
   comparing the start tag to a predefined list of tags to exclude; and
   excluding the start tag, embedded function, and end tag in the second email message responsive to the start tag being included in the predefined list of tags to exclude; and
   displaying the second email message in response to the indication to display the first email message.

2. The system of claim 1, wherein the embedded function includes self-executing code.

3. The system of claim 1, wherein the operations further comprise forwarding the first email message in response to receiving a selection to forward the second email message.

4. The system of claim 3, wherein the operations further comprise forwarding the first email message in response to receiving the selection to forward the second email message without altering contents of the first email message.

5. The system of claim 1, wherein the predefined list of tags to exclude includes tags that are amenable to self-executing code.

6. The system of claim 5, wherein the tags that are amenable to self-executing code include a tag indicating that the embedded function is in JavaScript.

7. The system of claim 1, wherein the operations further comprise receiving the indication to display the first email message based on a cursor being placed over the first email message.

8. The system of claim 1, wherein the operations further comprise preventing execution of the embedded function.

9. The system of claim 1, wherein the operations further comprise:
   identifying a second start tag within the first email message, the second start tag indicating a beginning of tagged content within the first email message;
   identifying a second end tag within the first email message, the second end tag corresponding to the second start tag and indicating an end of the tagged content;
   comparing the second start tag to the predefined list of tags to exclude; and
   including the second start tag, tagged content, and second end tag in the second email message if the second start tag is not included in the list of tags to exclude.

10. The system of claim 1, wherein generating the second email message further includes excluding an argument associated with the start tag.

11. The system of claim 1, wherein the operations further comprise opening an email read window.

12. The system of claim 11, wherein displaying the second email message comprises displaying the second email message in the email read window.

13. A method, comprising:
   generating, in response to receiving an indication to display a first email message, a second email message from the first email message, wherein generating the second email message includes:
   identifying a start tag within the first email message, the start tag indicating a beginning of an embedded function within the first email message;
   identifying an end tag within the first email message, the end tag corresponding to the start tag and indicating an end of the embedded function;
   comparing the start tag to a predefined list of tags to exclude; and
   excluding the start tag, embedded function, and end tag in the second email message responsive to the start tag being included in the predefined list of tags to exclude; and
   displaying the second email message in response to the indication to display the first email message.

14. The method of claim 13, wherein the embedded function includes self-executing code.

15. The method of claim 13, further comprising forwarding the first email message in response to receiving a selection to forward the second email message.

16. The method of claim 13, further comprising deleting the second email message responsive to user selection of a third email message.

17. The method of claim 13, wherein generating the second email message further includes excluding an argument associated with the start tag.

18. The method of claim 13, wherein displaying the second email message comprises providing an email preview pane in an email client.

19. The method of claim 13, further comprising preventing execution of the embedded function.

20. A non-transitory computer-readable medium comprising instructions, which when executed by a processor, cause the processor to perform operations comprising:

generating, in response to receiving an indication to display a first email message, a second email message from the first email message, wherein generating the second email message includes:

identifying a start tag within the first email message, the start tag indicating a beginning of an embedded function within the first email message;

identifying an end tag within the first email message, the end tag corresponding to the start tag and indicating an end of the embedded function;

comparing the start tag to a predefined list of tags to exclude; and excluding the start tag, embedded function, and end tag in the second email message responsive to the start tag being included in the predefined list of tags to exclude; and displaying the second email message in response to the indication to display the first email message.

* * * * *